United States Patent

Krahl

[15] 3,644,697

[45] Feb. 22, 1972

[54] PROTECTIVE GAS FOR ARC WELDING

[72] Inventor: Alfred Krahl, Messer Griesheim GmbH, Landstr. 300, Frankfurt am Main, Hanauer, Germany

[22] Filed: Apr. 21, 1969

[21] Appl. No.: 818,150

[30] Foreign Application Priority Data

Apr. 27, 1968 Germany....................P 17 65 306.4

[52] U.S. Cl.................................................219/74, 219/137
[51] Int. Cl..........................................................B23k 9/16
[58] Field of Search......................219/74, 75, 137; 252/372

[56] References Cited

UNITED STATES PATENTS

| | | | |
|---|---|---|---|
| 2,874,030 | 2/1959 | Dennis | 219/74 UX |
| 2,906,857 | 9/1959 | Nestov | 219/74 X |
| 2,932,721 | 4/1960 | Kooistra | 219/74 |
| 3,149,220 | 9/1964 | Soulary | 219/74 |
| 3,066,215 | 11/1962 | Espy | 219/74 |

*Primary Examiner*—R. F. Staubly
*Assistant Examiner*—J. G. Smith
*Attorney*—Connolly and Hutz

[57] ABSTRACT

A protective gas for the arc welding of materials such as high-alloyed ferritic chrome steel, austenitic chrome-nickel steel and chrome-nickel-molybdenum steel includes a mixture of argon and nitrogen with the nitrogen content being 1 to 20 percent and preferably 5 to 10 percent by volume. An addition of more than trace amounts and up to 10 percent by volume of oxygen is also proposed. An advantageous form of the gas contains 5 percent by volume of nitrogen and 3 percent by volume of oxygen.

9 Claims, No Drawings

PROTECTIVE GAS FOR ARC WELDING

BACKGROUND OF INVENTION

This invention relates to a protective gas for arc welding of high-alloyed ferritic chrome steel, austenitic chrome-nickel steel and chrome-nickel-molybdenum steel.

Nitrogen can occur in stable solution and as nitride in steel, and in this connection is the feared steel indicator, while in certain instances is the desired alloying element. In ferritic-pearlitic steel nitrogen causes, as a dissolved element, changes in properties known as aging as well as blue brittleness. Even the tendency of nitrogen-containing unalloyed and low-alloyed steel to intercrystalline stress corrosion is indicated. Nitrogen contained in steel as nitride has a granule-refining effect and thereby increases the yield point without decreasing ductility. For the welding process the properties of nitrogen of moving the martensite point in carbon steel to lower temperatures, of increasing reaction times in the TTT diagram, and of slowing down the course of the interstage conversion are undesirable, since they favor a hardening of the radius of heat influence and the occurrence of higher conversion pressures. Since in a nitrogen-containing welding atmosphere by dissociation and ionization in the welding arc, nitrogen reaches into the melt in particularly large amounts, the danger of the resulting of pores is great. The extent of the pore formation in this connection is not only dependent on the nitrogen supply in the welding atmosphere, but also on the type and amount of the alloy elements in the basic and admixed material which can chemically bind nitrogen. Alloy elements which form nitrides at high temperatures up to below the melting point of the steel, such as titanium, zirconium, aluminum, niobium, chromium, and silicon, move the limiting content of nitrogen for the pore formation to higher values. F. Rupertus and coworkers have experimentally shown this for aluminum. As set forth in the works of T. M. Slutskaya and coworkers as well as T. Kobayashi, with sufficient proportions in the welding wire of deoxidation and denitration agents, arc welding is even possible with allegedly useful results without protective gas in the air. However, it should be pointed to the fact particularly important for the welding process that the denitration elements protect steel from pore formation and aging only then when in the cooling of the welding material sufficient time exists for special nitride formation. Thereupon in the usually very quickly cooling welding material, only a limited binding of the absorbed nitrogen by means of nitride constituents in the admixed material can be counted on. Furthermore, a large proportion of special nitrides also cannot be without negative effect on the ductility of the steel.

The results of systematic investigations and the experience from welding practice agree in the determination that the customary ferritic-pearlitic steel in arc welding with melting-off raw wire electrode in commercial welding speeds react very sensitively with pore formation even to very small nitrogen proportions in the protective gas. Even when the danger of aging of nitrogen-charged welding material would be removed, nitrogen-containing protective gases are not suitable for these types of steel, in view of the pore formation alone. W. Hummitzsch gives an encompassing picture concerning the results of nitrogen in arc welding.

In the high-alloyed chrome-nickel steel, nitrogen can be introduced as the alloy element for the austenite stabilization. Possibilities of the production and use of nitrogen-alloyed steel are given by V. Nicolas in his evaluation of the extensive literature. Viewed in the welding technical scope, nitrogen is much less dangerous for the high-alloyed chrome-nickel steel than for carbon steel. This is based on the absorbability for nitrogen, increased by the elements molybdenum, manganese, chromium, niobium, and vanadium, and in austenitic steel, furthermore, in the high nitrogen solubility of the cubinplane centered $\gamma$-modification of the iron. The austenitic chrome-nickel steel further retain still sufficient ductility even in noteworthy nitride intercalations. Based on its great absorbability for nitrogen, the high-alloyed chrome-nickel steel should thereupon not react so critically as carbon steel by pore formation on nitrogen proportions in the welding atmosphere. The problem of aging does not exist for high-alloyed steel. For the low nitrogen-pore susceptibility of high-alloyed chrome-nickel steel, the poor heat conductivity of these materials is also at fault, enabling slow cooling of the welding material and thus a better degassing by effusion and chemical removal.

The pure protective gases and protective gas mixtures available commercially for high-alloyed chrome and chrome-nickel steel are not satisfactory for arc welding with melting-off wire electrode. Consequently, either the requirement of pore-free welding material is not fulfilled or they cause poor welding behavior (spraying), yield disadvantageous seam and penetration forms, endanger the stability against intercrystalline corrosion or do not allow a short arc technique.

SUMMARY OF INVENTION

The object of this invention is to provide a protective gas which fulfills the above-indicated requirements.

According to the invention, such a protective gas is characterized by a mixture of argon and nitrogen, where the nitrogen content amounts to 1–20 and preferably 5–10 percent by volume. In extremely low-welding speeds, the nitrogen content can amount to 15–20 percent, while for commercial welding speeds a nitrogen content of 5–10 percent is recommended according to the purpose of use.

DETAILED DESCRIPTION

There has already been proposed an argon-nitrogen mixture as protective gas for metallurgical purposes (German Pat. application No. M 70 092 IVa/18c). This is distinguished from the subject matter of the invention in that reducing gases are released in the nitrogen constituent, a characteristic which is undesirable for the purposes of the invention, as is explained in more detail below.

As for the rest, no indication of the extent of the nitrogen constituent is obvious from the above suggestion. The correct measurement of the nitrogen constituent, however, is very essential for a successful use of the invention. Even in pure nitrogen atmosphere, melted down welding wire remained intercrystalline corrosion proof according to Stahl-Eisen-Prufblatt 1875–61 (Steel-Iron-Testing Sheet 1875–61). Nonporosity, however, was achievable most advantageously in the single layer welding and much slower welding bath cooling in the multilayer welding. The reason for pore formation in the multilayer welding should be based on the fact that the nitrogen removed as nitride in the lower layers becomes free in gas form by nitride decomposition in overwelding, can no longer rise up to the bath surface, and forms pores at the penetration limits. As can be shown in the welding of the first layer, the nitrogen separated in the welding bath in bubbles near the seam surface is successful in rising mostly to the seam surface and to escape. The cooling speed of the welding bath has great influence on the pore formation.

It is therefore required to lessen by sufficient thinning of the nitrogen welding atmosphere with argon, the charge of the welding material by way of nitrogen in such a manner that no pores occur any more in customary welding requirements. The property of argon is contrary to this purpose of reducing the cathode fall and thus the nitrogen charge of the welding bath.

As already mentioned above, it is disadvantageous for the purpose of the invention to admix to the protective gas reducing additives. Furthermore, the invention proposes that in addition up to 10 percent by volume of oxygen is to be added to the argon-nitrogen mixture. There is, therefore, more than mere trace amounts of minor impurities of oxygen. In an advantageous form of this invention the mixture contains 5 percent by volume of nitrogen and 3 percent by volume of oxygen. The oxygen facilitates the welding bath degassing, since it lowers the surface pressure of the melts and increases the bath temperature. Nitrogen absorption decreases the $\gamma$-ferrite content in welding material of metastable-austenitic chrome-nickel steel; the assurance against heat rise, however, remains in existence in the use of the recommended protective gases. Nitrogen-containing protective gases on the basis of argon enable both the spray type arc technique as well as the short arc technique with respect to high-alloyed steel and result in an advantageous penetration and good seam appearance with a good melt-off performance.

In the exact composition of the protective gas within the novel limits, it is further suitable to take into consideration the composition of the material to be welded, particularly the content of nitride constituents and deoxidating elements.

What is claimed is:

1. In a protective gas for arc welding characterized by said gas consisting of a mixture of argon, nitrogen and oxygen, said nitrogen content being from 5 to 10 percent by volume, and said mixture including more than trace amounts and up to 10 percent by volume of oxygen.

2. In the gas of claim 1 wherein said mixture contains 5 percent by volume of nitrogen and 3 percent by volume of oxygen.

3. In a process for obtaining a high-quality welding seam in the arc welding of metals selected from the group consisting of high-alloyed ferritic chrome steel, austenitic chrome-nickel steel, and chrome-nickel-molybdenum steel with the utilization of a protective gas, the improvement comprising the protective gas consisting of a mixture of argon and nitrogen with the nitrogen content being from 1 to less than 10 percent by volume.

4. In the process of claim 3 wherein the nitrogen content is from 5 to 10 percent by volume.

5. In a process for the arc welding of metals selected from the group consisting of high-alloyed ferritic chrome steel, austenitic chrome-nickel steel, and chrome-nickel-molybodenum steel with the utilization of a protective gas, the improvement comprising the protective gas consisting of a mixture of argon and nitrogen and oxygen with the nitrogen being from 1 to 20 percent by volume of the mixture and the oxygen being from more than trace amounts up to 10 percent by volume.

6. In the process of claim 5 wherein the oxygen is about 3 percent by volume.

7. In a process for the arc welding of metals selected from the group consisting of high-alloyed ferritic chrome steel, austenitic chrome-nickel steel, and chrome-nickel-molybdenum steel with the utilization of a protective gas, the improvement comprising the protective gas consisting of a mixture of argon and nitrogen and oxygen, the nitrogen content being from 5 to 10 percent by volume, and the oxygen content being more than trace amount and up to 10 percent by volume.

8. In the process of claim 7 wherein said mixture contains 5 percent by volume of nitrogen and 3 percent by volume of oxygen.

9. In the process of claim 7 including determining the content of the mixture constituents in accordance with the content of nitride constituents and deoxidizing elements in the material to be welded.

* * * * *